(12) United States Patent
Kowtun

(10) Patent No.: US 8,961,245 B2
(45) Date of Patent: Feb. 24, 2015

(54) POWER DISTRIBUTION BOX AND METHOD FOR PRODUCING SAME

(71) Applicant: Lear Corporation, Southfield, MI (US)

(72) Inventor: Peter Kowtun, Plymouth, MI (US)

(73) Assignee: Lear Corporation, Southfield, MI (US)

( * ) Notice: Subject to any disclaimer, the term of this patent is extended or adjusted under 35 U.S.C. 154(b) by 123 days.

(21) Appl. No.: 13/873,513

(22) Filed: Apr. 30, 2013

(65) Prior Publication Data

US 2014/0322934 A1 Oct. 30, 2014

(51) Int. Cl.
H01R 11/09 (2006.01)
B60R 16/023 (2006.01)

(52) U.S. Cl.
CPC .......... *B60R 16/0238* (2013.01); *Y10S 439/949* (2013.01)
USPC ........................................... 439/723; 439/949

(58) Field of Classification Search
CPC ....................................................... H01R 9/226
USPC ................................. 439/949, 76.2, 721, 723
See application file for complete search history.

(56) References Cited

U.S. PATENT DOCUMENTS

| 6,884,090 B2 | 4/2005 | Kubota |
| 6,887,084 B2 | 5/2005 | Saito et al. |
| 7,371,080 B1 * | 5/2008 | Masters et al. ............... 439/76.2 |

* cited by examiner

*Primary Examiner* — Ross Gushi
(74) *Attorney, Agent, or Firm* — Brooks Kushman P.C.

(57) ABSTRACT

A power distribution box and a method for producing a PDB include molding a lower cover with an integrated protector plate such that a unitary structure is formed. A busbar is inserted into a bottom side of a frame, and a lower cover is attached to the frame from the bottom side, thereby capturing the busbar between the frame and the lower cover. Integrating the protector plate into the lower cover eliminates a molding process, an assembly process, and adds structural integrity to the lower cover without the addition of extra structural support members, thereby reducing material use and the weight of the assembled device.

18 Claims, 3 Drawing Sheets

POWER DISTRIBUTION BOX AND METHOD FOR PRODUCING SAME

TECHNICAL FIELD

The present invention relates to a power distribution box and a method for producing a power distribution box.

BACKGROUND

Power distribution boxes (PDB's) are used in various electric and electronic systems, including passenger and commercial vehicles, where they are commonly used as fuse boxes. A PDB may consist of a number of different components such as a lower cover, a busbar and a frame, and may be assembled using a "top-down" or "bottom-up" method. Examples of PDB's using these assembly methods are described, for example, in the U.S. Pat. No. 7,371,080 issued to Masters et al. on 13 May 2008, which is hereby incorporated herein by reference. As described in Masters et al. the addition of a separate protector plate to separate wires from the electrically conducting surfaces of the busbar complicates assembly of the PDB.

In addition, a separately molded protector plate requires retaining features so that it can be attached to a lower cover, and additional retaining features so that it can be attached to the frame. Depending on the particular application for the PDB, it may need to meet certain structural strength requirements. Because the protector plate is a separate piece, it does not contribute significantly to the strength of the lower cover, and the lower cover may need to be constructed with a number of structural reinforcements. Therefore, a need exists for a PDB wherein a protector plate does not need to be separately assembled to a lower cover or frame, thereby eliminating the need for an assembly step, and eliminating separate retaining features provided on the mating components. A need also exists for a PDB having a protector plate that can add structural integrity to a lower cover, thereby helping to eliminate additional structural support members, leading to reduced overall weight and wall thickness for the lower cover.

SUMMARY

At least some embodiments of the present invention include a power distribution box (PDB) having a bottom-up construction and including a frame including a top side, a bottom side, and a plurality of frame apertures disposed therethrough. A busbar is connectable to the bottom side of the frame and has a plurality of busbar terminals extending upwardly for insertion into corresponding apertures in the frame. A lower cover has an integrated protector plate and together they form a unitary structure. The lower cover is connectable to the frame from the bottom side of the frame and includes a plurality of cover apertures therethrough for receiving wires to be inserted into corresponding frame apertures. The integrated protector plate has a plurality of wire protecting features for inhibiting contact between the busbar and wires disposed through the lower cover and retained by the frame.

At least some embodiments of the present invention include a PDB having a bottom-up construction and including a frame including a top side, a bottom side, a plurality of frame apertures disposed therethrough, and a plurality of wire retaining features. Each of the wire retaining features is configured to retain a corresponding wire inserted from the bottom side of the frame. A busbar is disposed on the bottom side of the frame and has a plurality of busbar terminals extending upwardly through corresponding frame apertures. A lower cover is disposed on the bottom side of the frame and includes a plurality of cover apertures therethrough for receiving wires to be retained by the frame. The lower cover further includes an integrally molded protector plate having a plurality of wire protecting features for inhibiting contact between the busbar and wires disposed through the lower cover and retained by the frame.

At least some embodiments of the present invention include a method for producing a PDB including molding a lower cover with an integrated protector plate, inserting a busbar into a frame from a bottom side of the frame and attaching the lower cover to the frame from the bottom side of the frame.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
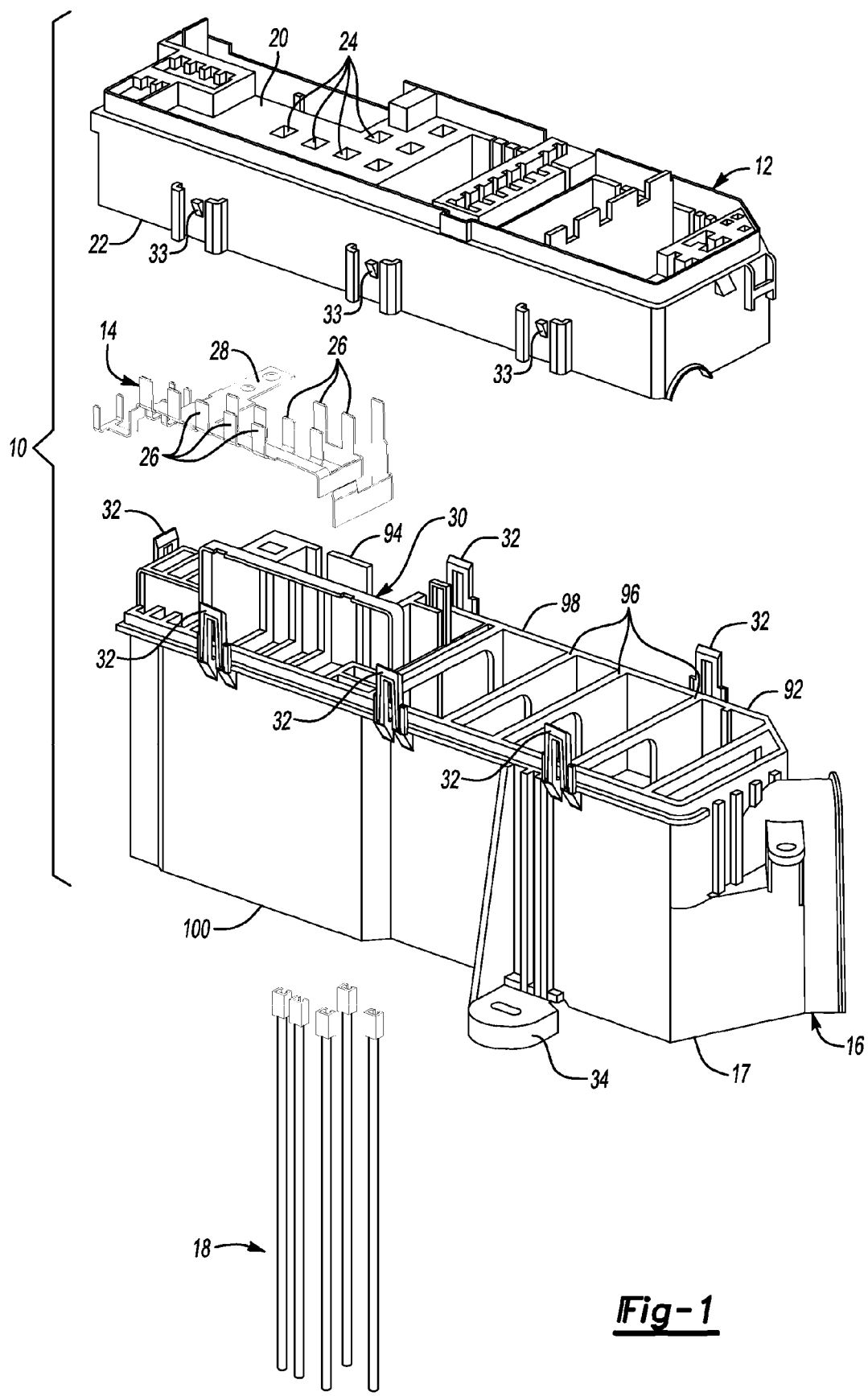
FIG. 1 shows an exploded view of a PDB in accordance with embodiments of the present invention.

FIG. 1 shows a power distribution box (PDB) 10 in accordance with an embodiment of the present invention. The PDB 10 includes a frame 12, a busbar 14, and a lower cover 16. A plurality of wires 18 are shown below the lower cover 16, and as explained in more detail below, are configured to be inserted through a bottom side 17 of the lower cover 16 and apertures in the lower cover 16 and apertures in the frame 12 where they are retained by wire retaining features. As discussed in more detail below, wire retaining features in a frame, such as the frame 12, may engage the wire itself—e.g., insulation on the outside of the wire—or it may engage a terminal on an end of the wire; in either case, the effect is that the wire is retained within the frame. The frame 12 includes a top side 20 and a bottom side 22. A plurality of frame apertures 24 (for clarity, not all of the apertures are labeled) are disposed through the top and bottom sides 20, 22.

The busbar 14 includes a plurality of busbar terminals 26 (also for clarity, not all of the terminals are labeled) extending upwardly for insertion into corresponding apertures 24 in the frame 16. The horizontally extending member 28 of the busbar 26 includes a pair of apertures and is configured for connection to a power source, such as a vehicle battery. The lower cover 16 includes an integrated protector plate 30, which forms a unitary structure with the rest of the lower cover 16. In particular, the protector plate 30 is integrally molded with the rest of the lower cover 16 in a single mold. This provides a number of advantages over PDB's that use a two-piece, snap-together assembly. First, as previously noted, the protector plate 30 is made in the same mold as the rest of the lower cover 16, thereby eliminating the need for a second mold and a second molding process.

In addition to eliminating a mold, a separate molding process and an assembly process, the integrated protector plate 30 does not need to be attached to the frame 12 separately from the lower cover 16. In fact, retaining features 32 on the lower cover 16 which cooperate with mating features 33 on the frame 12 are the only connections that need to be used to keep the frame 12 attached to the lower cover 16. Therefore, retaining features do not need to be molded into the integrated protector plate 30 such as, for example, the snap-in retaining features shown in FIG. 1 of the Masters et al. reference. In addition to the retaining features 32, the lower cover 16 also includes a mounting flange 34, which can be used, for example, to mount the PDB 10 to a surface under the hood or in the trunk of a vehicle.

Figure 2:
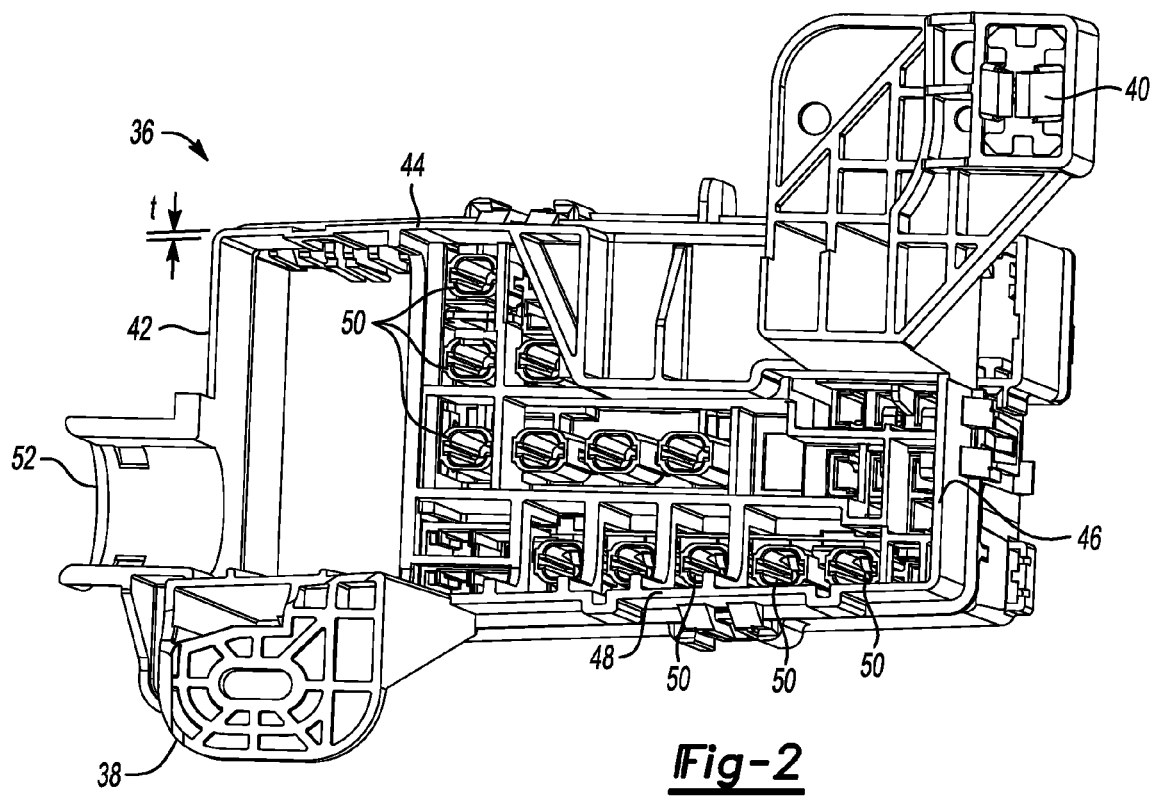
FIG. 2 shows a bottom view of a lower cover of a PDB in accordance with embodiments of the present invention.

FIG. 2 shows a lower cover 36 in accordance with another embodiment of the present invention. Similar to the lower cover 16 shown in FIG. 1, the lower cover 36 includes a mounting flange 38, and also includes a mounting clip 40. The lower cover 36 includes walls 42, 44, 46, 48, which extended downwardly from cover apertures 50 (which, for clarity, are not all labeled in the drawing figure). The walls 42-48 extend downwardly beyond the cover apertures 50 sufficiently such that wires, such as the wires 18 shown in FIG. 1, can be bundled within the walls 42-48. This is one of the functions of a lower cover, such as the lower cover 36—i.e., it allows wires that may be spaced relatively far apart from one another to be bundled, and potentially dressed with tape, placed in a conduit, etc., and then routed out of the lower cover, for example, through a wire takeout 52. Therefore, even in a top-down design (as opposed to the bottom-up design of the present invention) a lower cover serves the important purpose of allowing the PDB to be flush mounted on a surface while providing an egress for the bundled wires.

Also shown in FIG. 2 is a dimension (t) representing the thickness of the wall 44. Another of the advantages of having an integrally molded, integrated protector plate, such as the protector plate 30 shown in FIG. 1, is that it adds structural integrity to a lower cover. It may therefore be possible to reduce the thickness of the walls of the lower cover while still achieving the required strength. For example, in some automotive applications it may be necessary to mold a lower cover with walls having a thickness greater than 1.3 mm. Embodiments of the present invention, however, utilizing the additional strength of the integrated protector plate, may have wall thicknesses between 1.0 mm and 1.3 mm, and in the embodiment shown in FIG. 2, the walls 42-48 have a thickness (t) no greater than 1.0 mm.

Figure 3:
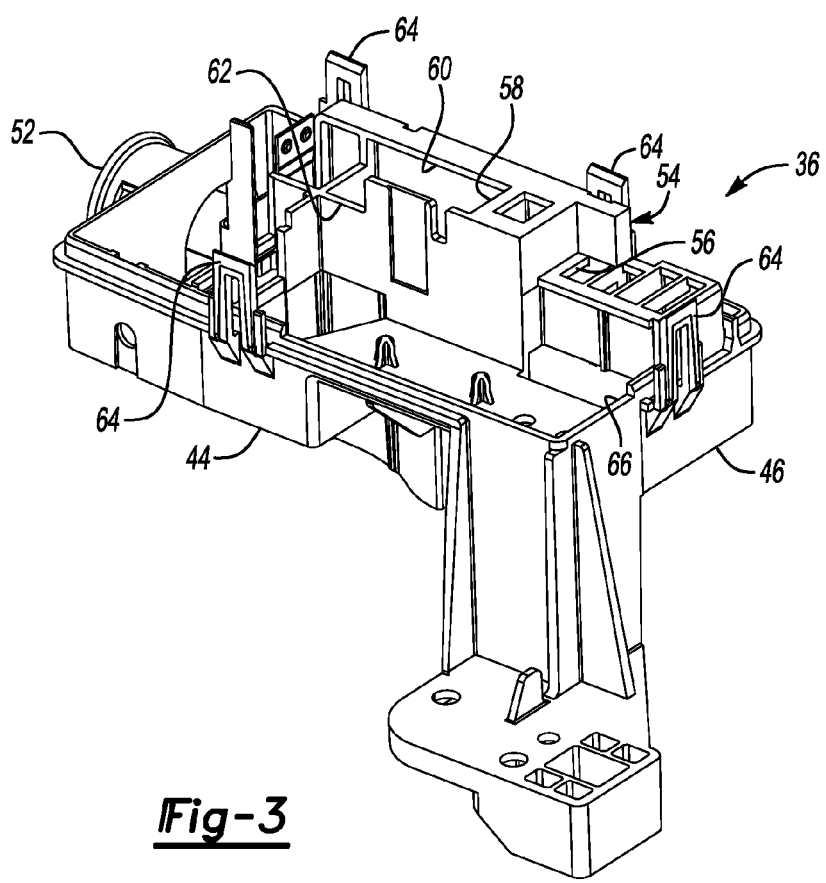
FIG. 3 shows a perspective view of the lower cover shown in FIG. 2.

FIG. 3 shows a perspective view of the lower cover 36 shown generally from the top. Similar to the lower cover 16, which had integrated protector plate 30, the lower cover 36 shown in FIG. 3 includes an integrally molded protector plate 54 forming a unitary structure with the rest of the lower cover 36. The integrated protector plate 54 includes a number of wire protecting features, which are generally configured as horizontal surfaces—see, for example, surfaces 56, 58, 60, 62. The surfaces 56-62 do not represent all of the wire protecting features of the integrated protector plate 54; however, they can be used to illustrate how the protector plate helps to inhibit wires, such as the wires 18 shown in FIG. 1, from undesirably contacting a busbar, which can lead to chafing of the insulation on the wires. This is explained in more detail with regard to FIG. 4. Also shown in FIG. 3, are retaining features 64, which are used to connect the lower cover 36 to a frame 70 (see FIG. 5), and a recessed portion 66, which is configured to hold a cassette that will be attached to a power source, such as a vehicle battery.

Figure 4:
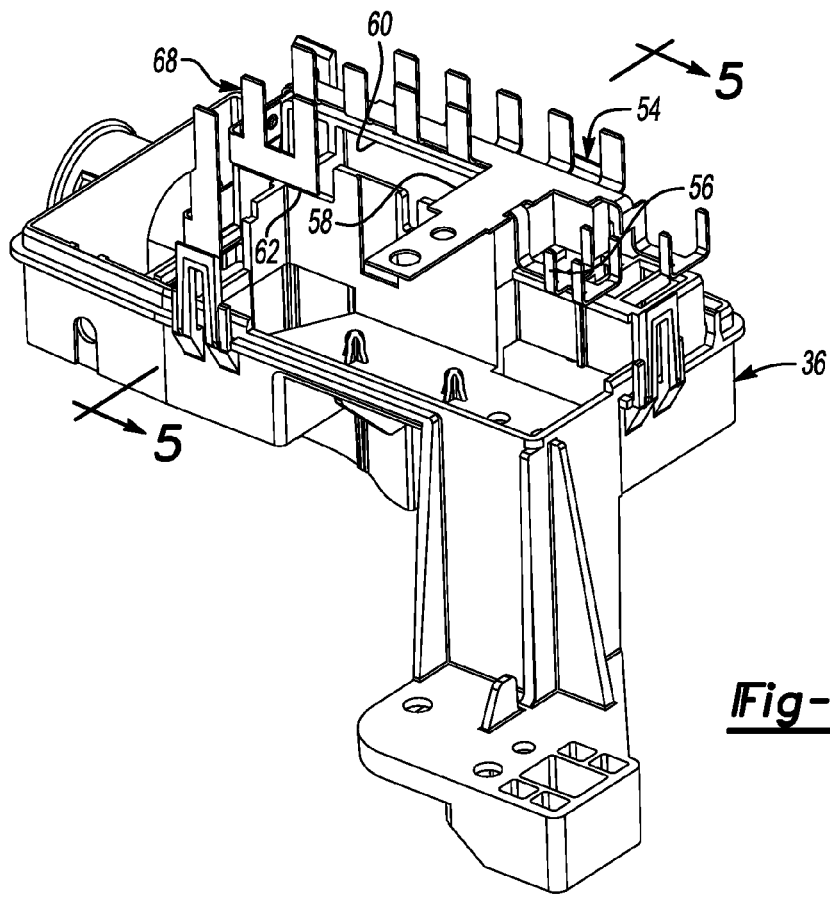
FIG. 4 shows the lower cover illustrated in FIG. 3 with a busbar attached.
Figure 5:
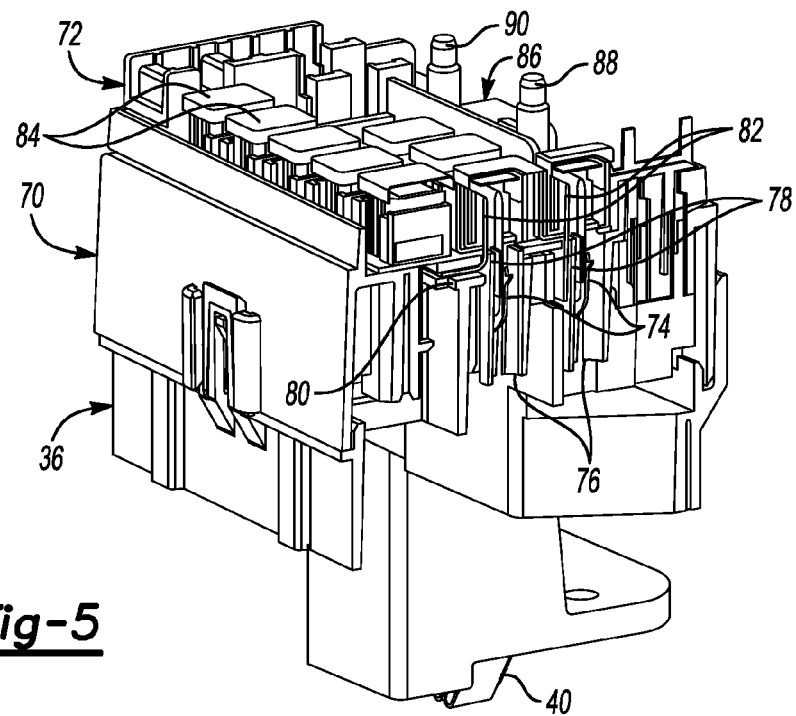
FIG. 5 shows a cross-sectional view of the lower cover and busbar shown in FIG. 4 assembled with a frame and wedge.

Turning to FIG. 4, the lower cover 36 is shown with a busbar 68 superimposed over the integrated protector plate 54. As shown in FIG. 4, the horizontal surfaces 56-62 of the integrated protector plate 54 overlap the edges of the busbar 68 such that wires coming up through the lower cover 36 will not be chafed or cut by the edges of the busbar 68 as they continue through to the frame 70, which is shown in FIG. 5. Turning to FIG. 5, a cross-sectional view of the lower cover 36 is shown as taken through the cut line 5-5 shown in FIG. 4, but with a frame 70 attached to the lower cover 36. On top of the frame 70 is a wedge 72 which, among other things, helps to retain wires, such as the wires 18 shown in FIG. 1, when they are inserted through the lower cover 36 and into the frame 70. In particular, the frame 70 includes a number of wire retaining features, commonly referred to as "terminal lock fingers", 74, which retain wires inserted through frame apertures 76. The terminal lock fingers 74 are of the type discussed above—i.e., they retain the wires by engaging with terminals on the respective ends of the wires.

As shown in FIG. 5, the wedge 72 includes wedge tabs 78, which are disposed adjacent the terminal lock fingers 74 to keep them from being displaced laterally, so that the inserted wires (not shown in FIG. 5) will not be released. Thus, in order to release wires inserted through the frame apertures 76 and retained by the terminal lock fingers 74, it is necessary to remove the wedge 72 from the top of the frame 70, thereby creating a space adjacent to the terminal lock fingers 74 whereby they can be displaced laterally so that terminals on the ends of the wires can be released and the wires removed. One of the horizontal surfaces 80 of the integrated protector plate 54, which acts as a wire protecting feature, is shown in FIG. 5 adjacent portion of the busbar 68, which is illustrated by the vertically oriented terminals 82.

In addition to providing the wedge tabs 78, the wedge 72 is configured to receive a number of fuses, which, in the embodiment shown in FIG. 5, are J-case fuses 84. In some configurations of a PDB, a busbar, such as the busbar 68, will be attached to a power source such as a vehicle battery, and then wires, such as the wires 18 shown in FIG. 1, will be attached to various vehicle accessories. Then, when a fuse connects the busbar and one of the wires, the accessory has a fused power supply. Also shown in FIG. 5 is a cassette 86 inserted into the cavity 66 (FIG. 3), and which contains terminal posts 88, 92 for connection to a power source such as a vehicle battery.

As described in detail above, having an integrally molded protector plate, such as the integrated protector plates 30 (FIG. 1) and 54 (FIG. 3), provides a number of advantages over snap-together configurations. One of the advantages, as discussed above, is the increased structural strength of a lower cover having an integrated protector plate. Returning to FIG. 1, it is shown that the lower cover 16 includes a first portion 92 and a second portion 94. The first portion 92 includes structural supports 96, which, in the embodiment shown in FIG. 1, are transverse members extending across a width of lower cover 16 from a first wall 98 to a second wall 100. In contrast, the second portion 94, which contains the integrated protector plate 30, has no such transverse structural supports, and it does not need them to maintain the required strength for the application. Thus, in addition to reducing wall thickness, integrating a protector plate into a lower cover allows for a reduction in the support structures molded into the lower cover, and can even reduce the weight of the assembled PDB.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A power distribution box (PDB) having a bottom-up construction, the PDB comprising:
    a frame including a top side, a bottom side, and a plurality of frame apertures disposed therethrough;
    a busbar connectable to the bottom side of the frame and having a plurality of busbar terminals extending upwardly for insertion into corresponding apertures in the frame; and
    a lower cover with an integrated protector plate forming a unitary structure, the lower cover being connectable to the frame from the bottom side of the frame and including a plurality of cover apertures therethrough for receiving wires to be inserted into corresponding frame apertures, the integrated protector plate having a plurality of wire protecting features for inhibiting contact between the busbar and wires disposed through the lower cover and retained by the frame, wherein the lower cover includes a plurality of walls extending downwardly from the cover apertures sufficiently such that wires inserted through the cover apertures can be bundled within the walls, the lower cover further including a wire takeout extending outwardly from one of the walls and configured to allow the wires to exit the lower cover through the wire takeout after the wires are bundled.

2. The PDB of claim 1, wherein the integrated protector plate is not connected to the frame separately from the lower cover.

3. The PDB of claim 1, wherein the lower cover has a first portion and a second portion, only the first portion of the first and second portions including a plurality of structural supports, and the second portion including the integrated protector plate.

4. The PDB of claim 3, wherein the structural supports include transverse members extending across a width of the first portion.

5. The PDB of claim 1, wherein the walls have a wall thickness no greater than 1.0 mm.

6. The PDB of claim 1, wherein the walls have a wall thickness between 1.0 mm and 1.3 mm.

7. A power distribution box (PDB) having a bottom-up construction, the PDB comprising:
    a frame including a top side, a bottom side, a plurality of frame apertures disposed therethrough, and a plurality of wire retaining features, each of the wire retaining features being configured to retain a corresponding wire inserted from the bottom side of the frame;
    a busbar disposed on the bottom side of the frame and having a plurality of busbar terminals extending upwardly through corresponding frame apertures; and
    a lower cover disposed on the bottom side of the frame and including a plurality of cover apertures therethrough for receiving wires to be retained by the frame, the lower cover further including an integrally molded protector plate having a plurality of wire protecting features for inhibiting contact between the busbar and wires disposed through the lower cover and retained by the frame.

8. The PDB of claim 7, wherein the integrally molded protector plate is not connected to the frame separately from the lower cover.

9. The PDB of claim 8, wherein the lower cover has a first portion and a second portion, the first portion including a plurality of transverse structural supports, and the second portion including the integrally molded protector plate.

10. The PDB of claim 9, wherein the lower cover includes a plurality of walls extending downwardly from the cover apertures sufficiently such that wires inserted through the cover apertures can be bundled within the walls.

11. The PDB of claim 10, wherein the transverse structural supports extend from a first of the walls perpendicularly across to a second of the walls opposite the first of the walls.

12. The PDB of claim 10, wherein the walls have a wall thickness no greater than 1.0 mm.

13. The PDB of claim 10, wherein the walls have a wall thickness between 1.0 mm and 1.3 mm.

14. A method for producing a power distribution box (PDB), comprising:
    molding a lower cover with an integrated protector plate such that the integrated protector plate is molded into a second portion of the lower cover and a plurality of support structures are molded into a first portion of the lower cover;
    inserting a busbar into a frame from a bottom side of the frame; and
    attaching the lower cover to the frame from the bottom side of the frame.

15. The method of claim 14, further comprising inserting a plurality of wires through a bottom side of the lower cover and into the frame.

16. The method of claim 15, wherein the integrated protector plate is not connected to the frame separately from the lower cover.

17. The method of claim 14, wherein the support structures are molded as transverse members extending across a width of the lower cover.

18. The method of claim 17, wherein the lower cover is molded with a plurality of walls having a wall thickness no greater than 1.0 mm.

* * * * *